No. 837,799. PATENTED DEC. 4, 1906.
W. D. COOK.
DISK PLOW.
APPLICATION FILED MAR. 20, 1906.

Witnesses
Edwin F. McKee
C. C. Hines

Inventor
William D. Cook
By Victor J. Evans
Attorney

UNITED STATES PATENT OFFICE.

WILLIAM D. COOK, OF SEIBERT, COLORADO.

DISK PLOW.

No. 837,799.     Specification of Letters Patent.     Patented Dec. 4, 1906.

Application filed March 20, 1906. Serial No. 307,081.

*To all whom it may concern:*

Be it known that I, WILLIAM D. COOK, a citizen of the United States, residing at Seibert, in the county of Kit Carson and State of Colorado, have invented certain new and useful Improvements in Disk Plows, of which the following is a specification.

This invention relates to improvements in rotary plows, and is designed to provide a plow of the disk class wherein a novel construction of furrow-former or plow proper is employed to simplify the structure over prior implements using a plurality of disks and to form a furrow which shall be smooth or free from the ridges or inequalities of surface produced when the ordinary disk plow is used, and, further, to provide simple and effective means whereby the plow may be adjusted to work at different diagonal angles to the line of draft and wherein scraper mechanism is provided to remove the earth from the furrow-former and to turn it over in such a way as to serve the function of a moldboard.

Figure 1:
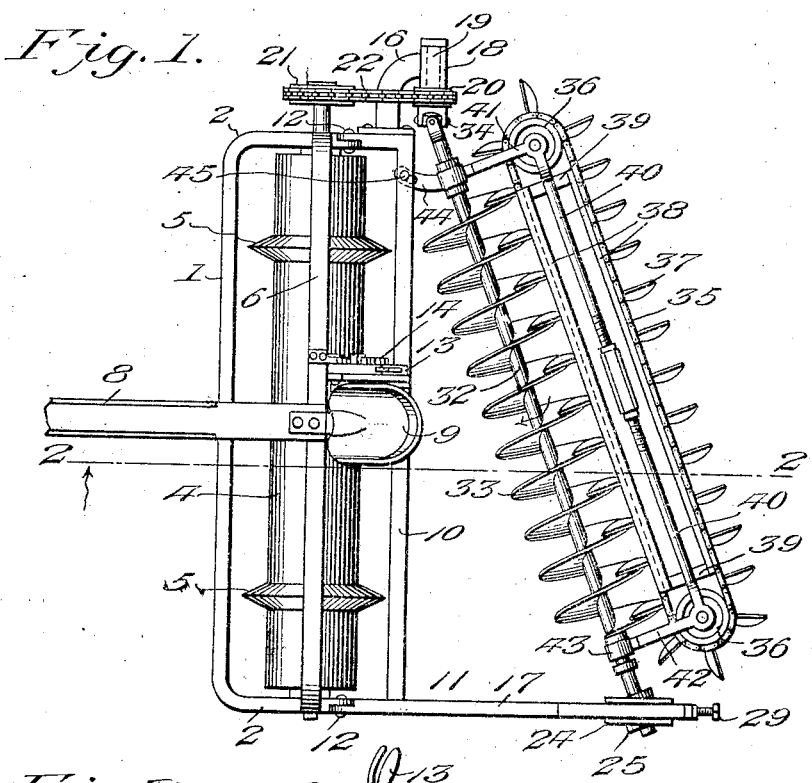
Figure 2:
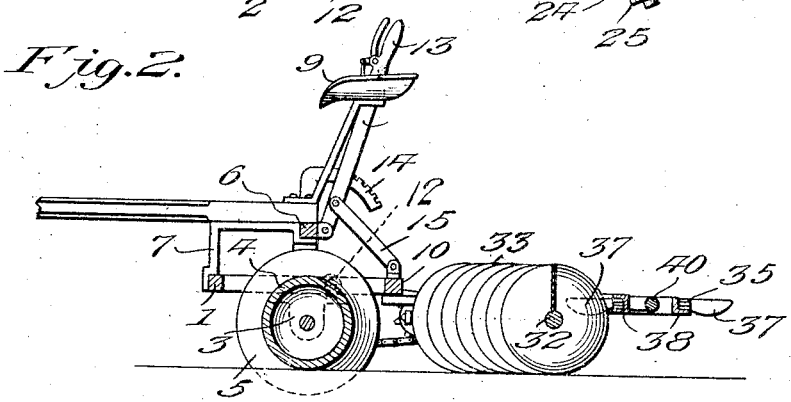
Figure 3:
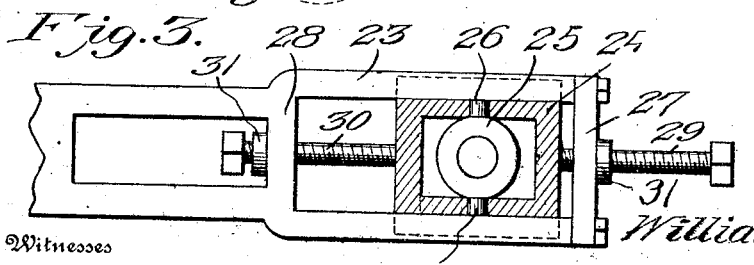

In the accompanying drawings, Figure 1 is a top plan view of a plow embodying my invention. Fig. 2 is a section thereof on line 2 2 of Fig. 1. Fig. 3 is a detail view, partly in side elevation and partly in section, showing the adjustable bearing for one end of the plow-shaft.

Referring to the drawings, the numeral 1 designates a front or main frame beam having rearwardly-turned ends 2, carrying bearings 3 for the journals upon the ends of a field or traction roller 4, which roller is provided with flanges 5 to enter the soil and hold the plow from side draft or lateral deflection.

The rearwardly-turned ends 2 of the beam 1 are connected and braced by an arched central beam 6, which is centrally connected with the beam 1 by a bracket 7, to which is suitably secured the rear end of a tongue or draft attachment 8, on which is supported a driver's seat 9.

A transverse beam 10 is arranged in rear of the roller in the plane of the beam 1 and is provided with forwardly-turned ends 11, hinged to the ends 2 of the front beam, as indicated at 12, whereby the beam 10 is adapted to swing in a vertical plane. An adjusting-lever 13 is pivoted to the beam 6 and carries a pawl to engage a rack 14, fixed to the beam 6, and is attached by a link 15 to the beam 10, by which the latter may be adjusted and supported in adjusted position.

The beam 10 is provided at its opposite ends with a short arm 16 and a long arm 17, which extend rearwardly therefrom, the arm 16 being in the form of a bracket carrying a bearing 18, in which is journaled a shaft 19, carrying a sprocket-wheel 20, said sprocket-wheel 20 being connected with a similar wheel 21 on an extended end of the shaft of the roller 4 by a chain 22.

The arm 17 is formed at its rear end with a slotted guideway 23, in which is slidably mounted a bearing-block 24, chambered to receive a bearing-sleeve 25, having trunnions 26 to turn therein. The rear end of the guideway 23 is closed by a cross-piece 27, removably secured thereto, and working in this cross-piece and a stationary cross-piece 28 at the forward end of the guideway are adjusting-screws 29 and 30, bearing on the block and whereby the latter may be moved forwardly or rearwardly, each screw being provided with a check-nut 31 to hold it in adjusted position.

The plow proper is arranged diagonally at the rear of the frame and comprises a shaft 32, carrying a spiral furrow-cutting blade 33. One end of the shaft 32 is connected with the shaft 19 through the medium of a universal joint 34, while the other end of said shaft 32 is journaled in the bearing member 25, the construction thus being such that the plow or furrow-former may be adjusted to lie at different diagonal angles to the line of draft and also swung vertically with the frame-beam 10 to vary its depth of penetration of the soil and to hold it elevated above the ground-surface during the transportation of the implement from place to place or to different portions of the field. Owing to the fact that the blade 33 is in the form of a cutting-screw whose portions are continuous, it will be readily understood that the earth cut away thereby will be conducted to one side and a furrow formed which will be entirely smooth or free from ridges.

A scraping device is arranged in rear of the cutting-blade and provided to remove the accumulated soil therefrom. This comprises an endless chain 35, passing around sprocket-wheels 36 and provided with a series of scraping wings or blades 37. The scraper as a whole is carried by a supporting-frame composed of longitudinal side bars 38, connected by end pieces 39. Slidably mounted in the end pieces 39 are rods 40, the outer ends of which are provided with bearings 41 to support the sprocket-wheels 36, which bearings terminate in forwardly-projecting arms 42, having sleeves 43, embracing the shaft 32. The sleeve adjacent the universal joint 34 is provided with an arcuate slotted extension 44, which extends beneath the beam 10 and is connected thereto by a bolt 45. This extension 44 holds the scraper from independent pivotal movement on the shaft 32 and at the same time permits of the adjustment of said scraper with the shaft. The scraper-fingers 37 are arranged at the proper angle to traverse the working faces of the convolutions of the spiral blade 33 and act to remove the accumulated soil therefrom and to turn over the soil, so that said fingers will form, in effect, a moldboard. As the spiral cutter 33 revolves the flanges or convolutions thereof will so act upon the fingers as to impart motion to the chain 35, thus securing an easy action of the parts and a sufficient individual range of motion of the fingers to free them from the soil scraped from the spiral cutter.

It will of course be understood that the sprocket drive-gearing may be proportioned to drive the shaft 32 and scraper at any desired rate of speed, and it will be seen that the construction described provides a plow proper which will cut a perfect furrow free from ridges or other irregularities and which is adjustable at different angles of the frame to suit different conditions of service.

Having thus described the invention, what is claimed as new is—

1. In a plow, the combination of a main frame having a pivoted portion adjustable in a vertical plane, means for adjusting and locking said pivoted portion in adjusted position, bearings carried by said pivoted portion of the frame, one of said bearings being slidably mounted, a drive-shaft journaled in the other bearing, a diagonally-arranged shaft disposed in rear of the main frame and jointed at one end to the drive-shaft and journaled at its opposite end in the sliding bearing, a spiral cutter carried by said diagonal shaft, supports carried by the diagonal shaft and connected with the pivoted portion of the main frame, a chain operatively mounted upon said supports in rear of the diagonal shaft to move in a plane in longitudinal alinement therewith, and scrapers carried by said chain to operate upon the convolutions of the spiral cutter.

2. In a plow, the combination of a main frame having a pivoted vertically-movable portion, means for adjusting and locking said portion in adjusted position, arms projecting from said pivoted portion, one of said arms being longer than the other, a drive-shaft journaled in the shorter arm, a diagonally-arranged shaft jointed at one end to said drive-shaft, a longitudinally-adjustable bearing in the long arm in which the other end of the diagonal shaft is journaled, and gearing for operating the drive-shaft.

3. In a plow, the combination of a main frame having a pivoted vertically-movable portion, arms of unequal length carried by said vertically-movable portion, a drive-shaft journaled in the short arm, a bearing longitudinally adjustable in the long arm, a diagonal shaft jointed at one end to the drive-shaft and journaled at its opposite end in said bearing, a spiral cutter carried by the diagonal shaft, and gearing for operating the drive-shaft.

4. In a plow, the combination of a main frame provided at the rear thereof with arms of unequal length, a drive-shaft journaled in the short arm, a bearing longitudinally adjustable in the long arm, a diagonally-arranged shaft having a universal-joint connection at one end with the drive-shaft and journaled at its opposite end in the bearing, a spiral cutter carried by said shaft, and gearing for operating the drive-shaft.

5. In a plow, the combination of a main frame, said frame being provided at its rear with arms of unequal length, a drive-shaft journaled in one of said arms, a bearing-block longitudinally adjustable on the other arm, a trunnion pivotally mounted in said bearing-block, a diagonal cutter-shaft having a universal-joint connection at one end with the drive-shaft and journaled at its opposite end in the trunnion, and means for operating the drive-shaft.

6. In a plow, the combination of a main frame having rearwardly-extending arms of unequal length, the short arm being provided with a bearing arranged parallel with the frame and the long arm with the longitudinal guideway, a drive-shaft journaled in the bearing of the short arm, a bearing-block adjustable in the guideway in the long arm, means for adjusting said block, a trunnion pivotally mounted in the bearing-block, a diagonal cutter-shaft having a universal-joint connection at one end with the drive-shaft and journaled at its opposite end in said trunnion, a spiral cutter carried by the diagonal shaft, and means for operating the drive-shaft.

7. In a plow, the combination of a main frame having a pivoted vertically-movable portion, means for adjusting and locking said portion in adjusted position, arms projecting rearwardly from said portion, one of said arms being shorter than the other, a drive-shaft journaled in the short arm, a bearing slidably and pivotally mounted in the long arm, a diagonally-arranged cutter-shaft having a universal-joint connection at one end with the drive-shaft and journaled at its opposite end in said bearing, and means for operating the drive-shaft.

8. In a plow, the combination of a main frame having rearwardly-extending arms of unequal length, a drive-shaft journaled in the short arm, a bearing slidably and pivotally mounted in the long arm, a diagonally-arranged cutter-shaft having a universal-joint connection at one end with the drive-shaft and journaled at its opposite end in the bearing, a spiral cutter carried by the diagonal shaft, gearing for operating the drive-shaft, supporting-arms pivotally connected with the diagonal shaft and extending rearwardly therefrom, said arms being connected at their rear ends to form a frame adjustably connected with the main frame, an endless carrier mounted on said frame in rear of the cutter, and scrapers carried by said carrier to act on the convolutions of the spiral cutter.

9. In a plow, the combination of a main frame having a pivoted vertically-movable portion, means for adjusting and locking said portion in adjusted position, arms of unequal length extending rearwardly from said pivoted portion, a drive-shaft journaled in the short arm, a bearing pivotally and slidably mounted in the long arm, a diagonally-arranged cutter-shaft having a universal-joint connection at one end with the drive-shaft and journaled at its opposite end in the bearing, means for operating the drive-shaft, a frame pivotally hung upon the diagonal shaft and adjustably connected with the pivoted portion of the main frame, an endless carrier mounted on said frame in rear of the spiral shaft, and scrapers on the carrier engaging the convolutions of the spiral cutter.

In testimony whereof I affix my signature in presence of two witnesses.

WILLIAM D. COOK.

Witnesses:
C. C. Hines,
H. Dittman.